INVENTORS
H. L. FORD
H. W. GOARD
R. A. KOBLE
J. R. OWEN

INVENTORS
H. L. FORD
H. W. GOARD
R. A. KOBLE
J. R. OWEN
BY Hudson E. Young
ATTORNEYS

United States Patent Office 3,156,525
Patented Nov. 10, 1964

3,156,525
PURIFICATION OF SODIUM DIURANATE
Harold L. Ford and James R. Owen, Grants, N. Mex., and Robert A. Koble and Howard W. Goard, Bartlesville, Okla., assignors to Phillips Petroleum Company, a corporation of Delaware
Filed Nov. 28, 1960, Ser. No. 72,010
5 Claims. (Cl. 23—14.5)

This invention relates to the recovery of uranium from uranium-bearing materials, such as coffinite and other ores, by the carbonate leaching process. More particularly, it relates to the purification of sodium diuranate ("yellow cake") obtained by the carbonate leaching process.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content. It is this leaching process that is the concern of the subject invention.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of an excess of caustic, such as sodium hydroxide. This addition of sodium hydroxide neutralizes the bicarbonate present and then causes the soluble uranium values to precipitate as sodium diuranate (this precipitate commonly called "yellow cake."). The solution containing the precipitated yellow cake is then thickened and separated, for example by filtering the thickened solution in a rotary filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Other metals and nonmetals are commonly associated with uranium-bearing material. The principal metal commonly associated with uranium-bearing materials is vanadium, although other metals such as zirconium, iron, titanium, barium, aluminum, silicon, antimony, and cobalt, and nonmetallic elements such as phosphorus are commonly associated with uranium-bearing materials. These other metals and nonmetals, especially vanadium, are commonly extracted with the uranium values in the carbonate leaching step and gradually build up in concentration in the process. For example, a typical secondary uranium ore such as coffinite will contain about 0.25 percent $U_3O_8$ and 0.1 percent $V_2O_5$, and during the leaching step about 10 to 20 percent of the vanadium present in the ore will also be leached. During the subsequent precipitation of the pregnant leach solution with caustic, some of the vanadium values present in the pregnant liquor will also be precipitated together with the uranium values, for example 40 to 60 percent of the $V_2O_5$ present in the pregnant liquor will precipitate with the yellow cake. In fact, up to 85 percent of the vanadium extracted from the ore may appear in the yellow cake produced. The other metals and nonmetals, present as impurities in the pregnant liquor, will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, a major purchaser of yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a price penalty if the vanadium content, expressed as $V_2O_5$, exceeds for example two weight percent of the $U_3O_8$ in the yellow cake, or the AEC may refuse to buy the yellow cake if the vanadium contaminant content is excessive. In many cases, the vanadium content of the yellow cake may be as high as 6 or 7 percent of the $U_3O_8$ content. Thus, there has arisen a need for an improved method for producing a purer yellow cake, especially a yellow cake having a relatively low vanadium content.

Accordingly, an object of this invention is to improve the recovery of uranium from uranium-bearing materials. Another object is to provide an improved method for recovering uranium values from uranium ores treated according to the carbonate leaching process. Another object is to purify the sodium diuranate, yellow cake, obtained by the carbonate leaching process for uranium ores. Another object is to substantially remove metals, such as vanadium, commonly associated with uranium-bearing materials, from yellow cake produced by the carbonate leaching process. Another object is to lower the vanadium content of yellow cake produced according to the carbonate leaching process. Another object is to recover valuable vanadium values from the yellow cake product produced according to the carbonate leaching process. Other objects and advantages of this invention will become apparent to those skilled in the art, without departing from the scope and spirit of this invention, from the following discussion, appended claims, and the accompanying drawing in which:

Figure 1:
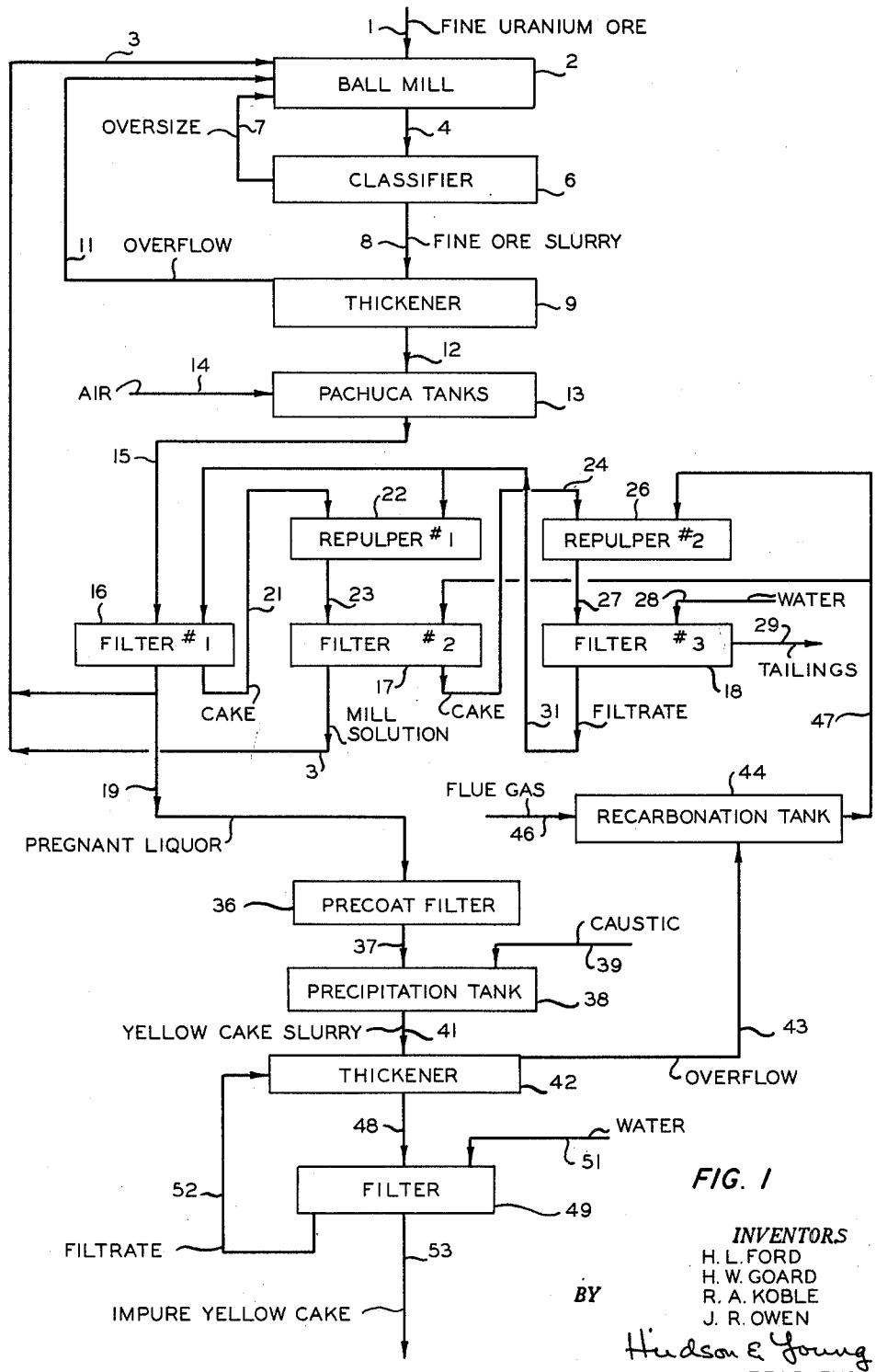
FIGURE 1 is a flowsheet schematically illustrating the carbonate leach process for the initial recovery of uranium values as impure yellow cake.

Referring now to the drawing, in which like reference numbers illustrate similar items, and initially to FIGURE 1, there is illustrated the carbonate leaching process for extracting uranium values from uranium-bearing ore. Fine uranium ore, prepared by crushing and classifying uranium ore, is passed via line 1 to a ball mill 2 where it is ground in the presence of a mill solution supplied via line 3 comprising hot recycled aqueous alkaline sodium carbonate-sodium bicarbonate. The resulting slurry of ground ore and leach solution is passed via line 4 to a classifier 6, from which oversize material is recycled via line 7 to ball mill 2, and the remaining fine ore slurry is passed via line 8 to thickener 9. Overflow from thickener 9 is recycled via line 11 to ball mill 2, and the underflow from thickener 9 is passed via line 12 to one or more Pachuca tanks 13 wherein the ore is leached at elevated temperatures to solubilize the uranium values. The slurry in Pachuca tanks 13 is contacted with oxygen by passing air therethrough, via line 14, and the slurry is maintained at a predetermined temperature for a period of time sufficient to cause all of the uranium values to go into solution as the stable soluble uranyl tricarbonate complex anion. The resulting slurry of leached pulp and pregnant liquor is then passed via line 15 to the first of a plurality of vacuum drum filters 16, 17, and 18, operated in series, where said slurry is filtered to separate pregnant liquor containing the soluble uranium values, this pregnant liquor being recovered via line 19.

The filtration of the slurry comprising leached pulp and pregnant liquor is generally accomplished by passing the slurry onto the first filter 16, the resulting filtrate 19 comprising the pregnant liquor containing the soluble uranium values. The filter cake from the first filter 16 is then passed via line 21 to a first repulper 22 and the resulting repulped slurry is passed via line 23 to the second filter 17. The filtrate resulting from the second filtration step comprises mill solution and it is passed via line 3 back to the ball mill 2. The filter cake from filter 17 is then passed via line 24 to a second repulper 26, and the resulting repulped slurry is passed via line 27 to the third filter 18. The filter cake on filter 18 is washed with water supplied via line 28 and then this filter make is removed from the filter and passed via line 29 as tailings to disposal. The filtrate from this last filtration step is recycled via line 31 for use in the first repulper 22 and for washing the filter cake in filter 16. The filter cake in filter 17 is washed with a barren liquor and some of the latter also is used in the second repulper 26, preparation of this barren liquor being subsequently described.

The pregnant liquor 19 is usually passed through a precoated drum filter 36 where it is clarified. The resulting clarified pregnant liquor is then passed via line 37 to a precipitation tank 38 where the soluble uranium values are precipitated by the addition of caustic or aqueous sodium hydroxide supplied via line 39. The resulting precipitate-containing solution or slurry is then passed via line 41 to a thickener 42. Overflow from thickener 42 is passed via line 43 to a recarbonation tank or tower 44 where it is recarbonated by passing carbon dioxide through it, using for example flue gas supplied via line 46. The recarbonated barren liquor is then recycled via line 47 for use in the above-described filtration process. The thickened slurry containing precipitated yellow cake is then passed via line 48 to a vacuum drum filter 49 where it is washed with water supplied via line 51. Filtrate from this filtering operation is recycled via line 52 to thickener 42. Impure yellow cake is then recovered via line 53 from filter 49.

As mentioned hereinbefore, the impure yellow cake obtained by the above-described conventional carbonate leach process contains impurities, such as vanadium values, such impurities being undesirable because their presence makes the subsequent conversion of the yellow cake into uranium metal or other uranium compounds much more difficult. According to this invention, this impure yellow cake is purified by a novel process, which process will now be described.

Figure 2:
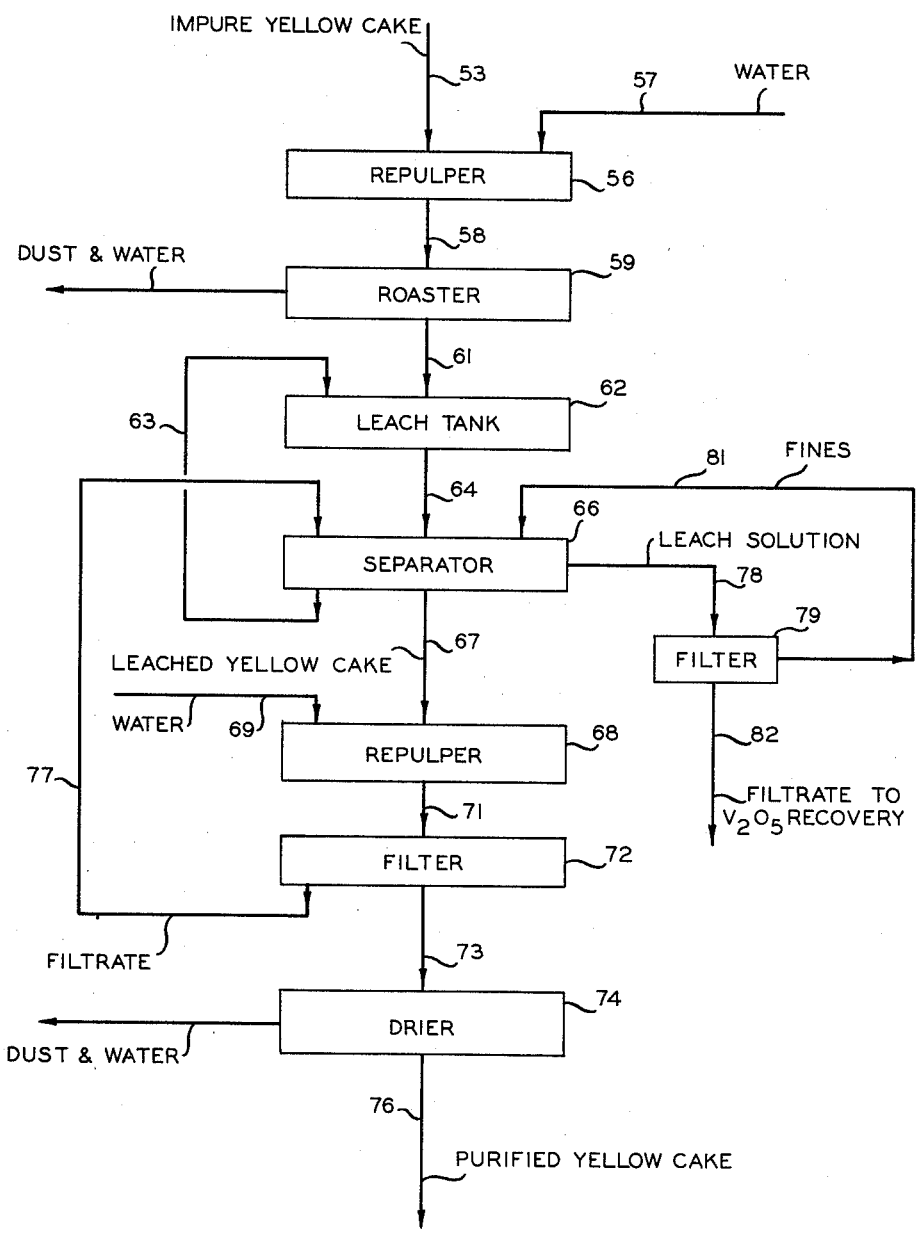
FIGURE 2 is a flowsheet which broadly illustrates a process for the purification of the impure yellow cake of FIGURE 1 according to this invention.

Referring now to the flowsheet of FIGURE 2, which broadly illustrates the purification process of this invention, the impure yellow cake obtained by line 53 from the filter 49 of FIGURE 1 is passed to a repulper 56 where it is slurried with water supplied via line 57. The resulting repulped slurry is passed via line 58 to a roaster 59, which comprises a furnace. In roaster 59 the impure yellow cake is heated or roasted in the presence of a salt supplying sodium ion, $Na^+$, such as sodium carbonate or sodium chloride. The source of the sodium ion necessarily present during the roasting step of this invention can be that of the residual or occluded sodium carbonate present in wet yellow cake recovered from the neutralized pregnant leach solution without filtering or washing the same, or the necessary presence of sodium ion during roasting can be insured by adding the sodium salt to yellow cake, either wet yellow cake or that which has been recovered by filtration and washed. Following the roasting of the yellow cake, for example at a temperature in the range of 1100 to 1700° F., preferably 1200 to 1600° F., the roasted yellow cake is passed via line 61 to a leach tank 62, where the roasted yellow cake is quenched and leached upon contact with an aqueous leaching solution supplied via line 63. The uranium values, present as sodium diuranate, $Na_2U_3O_7$, remain insoluble in the leaching solution, and the vanadium values are dissolved in the leaching solution. The resulting slurry comprising insoluble sodium diuranate and soluble vanadium values is then passed via line 64 to separation means 66, which comprises a filter and a thickener operated in series or in parallel. The separated leached or purified yellow cake slurry is passed via line 67 to a repulper 68 where it is reslurried with water supplied via line 69. The resulting yellow cake slurry is passed therefrom via line 71 to a drum filter 72 or the like and the filtered yellow cake via line 73 into a drier 74 comprising a furnace. Purified yellow cake containing a low amount of impurities, particularly a low content of vanadium impurity, is then obtained from drier 74 via line 76, this product then being passed to storage and packaging facilities. Filtrate from filter 72 is recycled via line 77 to separation means 66. Some of the separated leach solution is obtained from the separator 66 via line 78 and passed to a small filter 79, such as a plate-press filter, for the removal of a small amount of yellow cake which is recycled via line 81 to the separation means 66. The filtrate obtained is then passed via line 82 to suitable vanadium recovery equipment. This filtrate can be acidified, for example to a pH of 1.5, and heated to precipitate the solubilized vanadium values as red cake, sodium hexametavanadate, $Na_2H_2V_6O_{17}$. Separation of the latter and the melting of this residue, which results in driving off one molecule of water, results in the production of black cake, sodium pyrohexavanadate, $Na_2V_6O_{16}$, a valuable vanadium product.

The purified sodium diuranate obtained by the practice of this invention has a materially lower content of vanadium values, the $V_2O_5$ content being materially below AEC penalty levels, e.g., below 2 weight percent of the $U_3O_8$ content.

Figure 3:
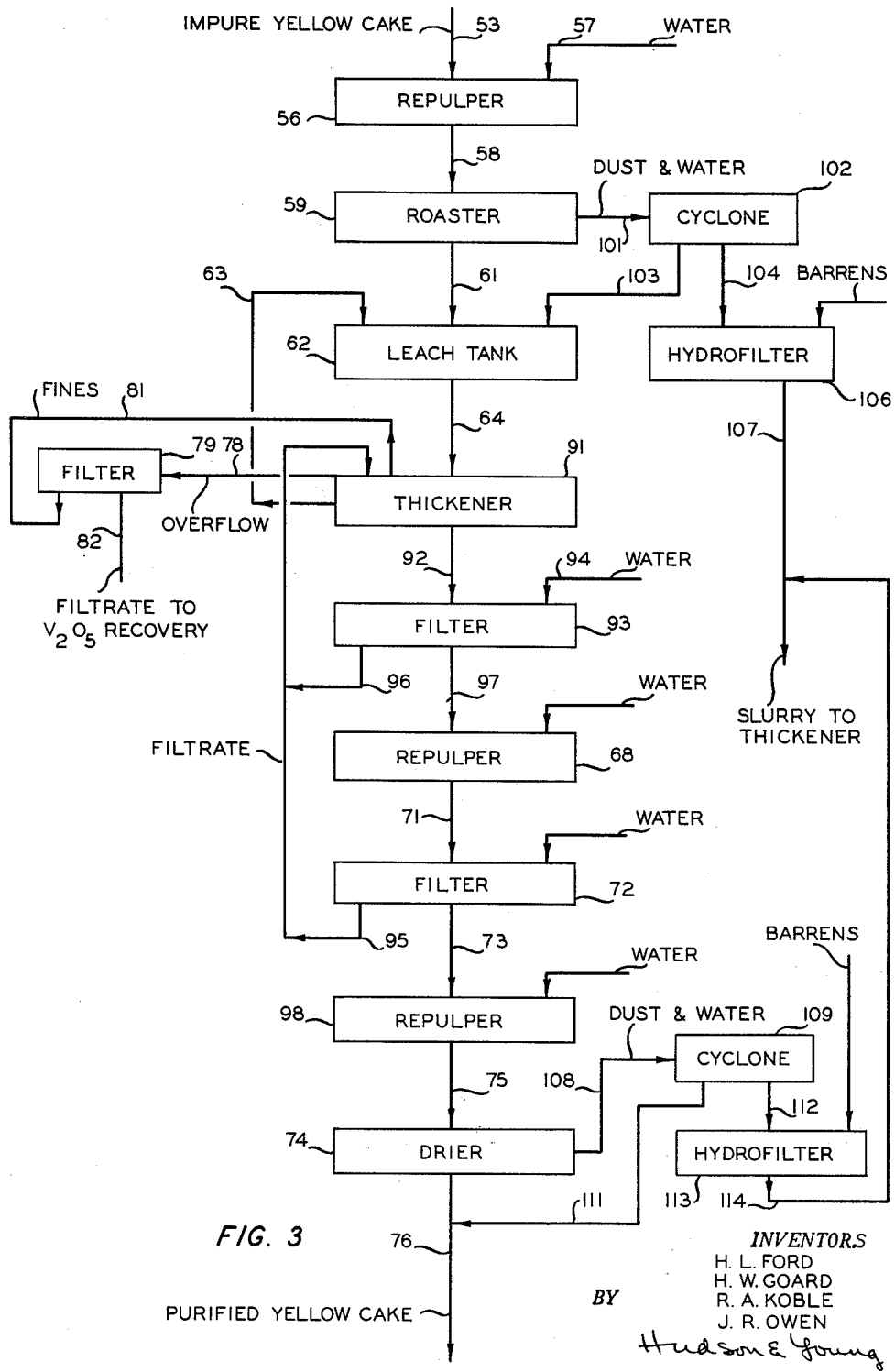
FIGURES 3 and 4 are flowsheets which illustrate in detail two different embodiments of the yellow cake purification process of this invention.

FIGURE 3 illustrates in detailed form one embodiment of the novel purification process of this invention. In this embodiment, the leached slurry comprising insoluble yellow cake and soluble vanadium values is passed via line 64 to a thickener 91 where the slurry is thickened. Overflow from thickener 91 is passed via line 78 to filter 79, for the recovery of leach solution containing the soluble vanadium values, as described above in connection with FIGURE 2. Some of the thickened solution is withdrawn from thickener 91 and recycled via line 63 for use as a leach solution in leach tank 62. The underflow from thickener 91 is passed via line 92 to a vacuum filter 93 where the slurry is filtered and washed with water supplied via line 94. The filtrate, comprising an aqueous solution containing some soluble vanadium values, is recycled from filter 93 via line 96 to thickener 91. The filtered insoluble yellow cake is passed from filter 93 via line 97 to repulper 68, and thence to filter 72, repulper 98, and drier 74 for the recovery of purified yellow cake.

The exhaust from roaster 59, comprising dust and water, is passed via line 101 to a cyclone separator 102, the resulting separated dust being passed via line 103 to leach tank 62. The off-gases from separator 102 are passed via line 104 to a hydrofilter 106 and contacted there with barren solution, such as that obtained as overflow from thickener 42 of FIGURE 1. The resulting slurry is then recycled via line 107 to the thickener 42 of FIGURE 1.

The exhaust 108 from drier 74 is similarly passed to a cyclone separator 109, the separated dust being passed via line 111 to the drier discharge line 76, and the off-gases being passed via line 112 to hydrofilter 113 where the gases are contacted with barren liquor and the resulting slurry recycled via line 114 and combined with that of line 107.

Figure 4:
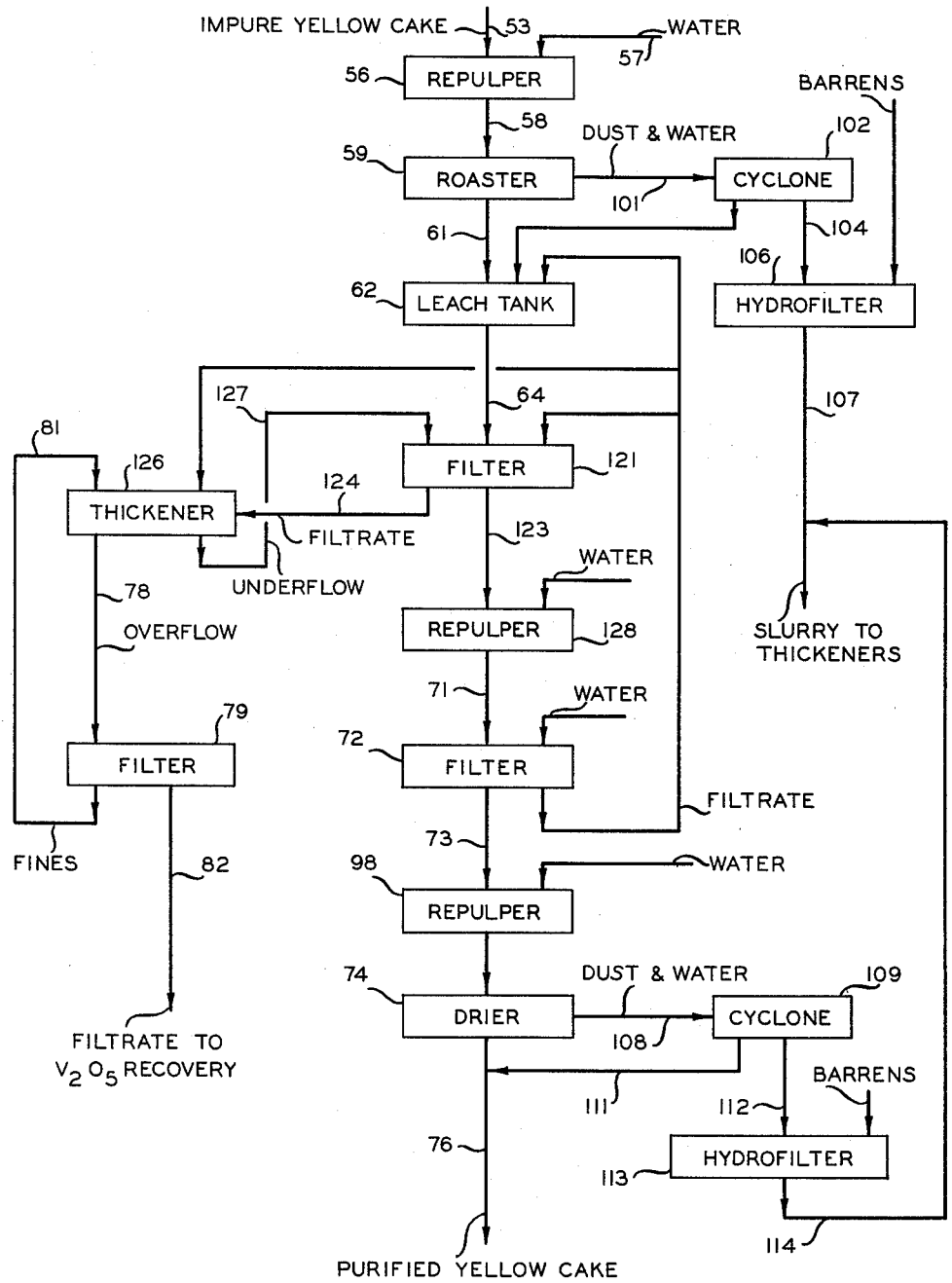

Referring now to the embodiment illustrated in FIGURE 4, the leached slurry comprising roasted yellow cake and solubilized vanadium values is passed via line 64 from leach tank 62 to a vacuum filter 121 for the separation of the insoluble yellow cake, which is removed from filter 121 via line 123. The filtrate from filter 121 is supplied via line 124 to thickener 126. Overflow from thickener 126 is supplied via line 78 to filter 79, as described in FIGURE 3, for the recovery of a filtrate 82 comprising the soluble vanadium values. Underflow from thickener 126 is recycled via line 127 to filter 121.

The filtered yellow cake is passed via line 123 to repulper 128 where it is reslurried with water and passed via line 71 to filter 72, and thence to repulper 98 and drier 74 for the recovery of purified yellow cake, as described in FIGURE 3. A portion of the filtrate from filter 72 is passed into at least one of leach tank 62, filter 121 and thickener 126.

Figure 5:
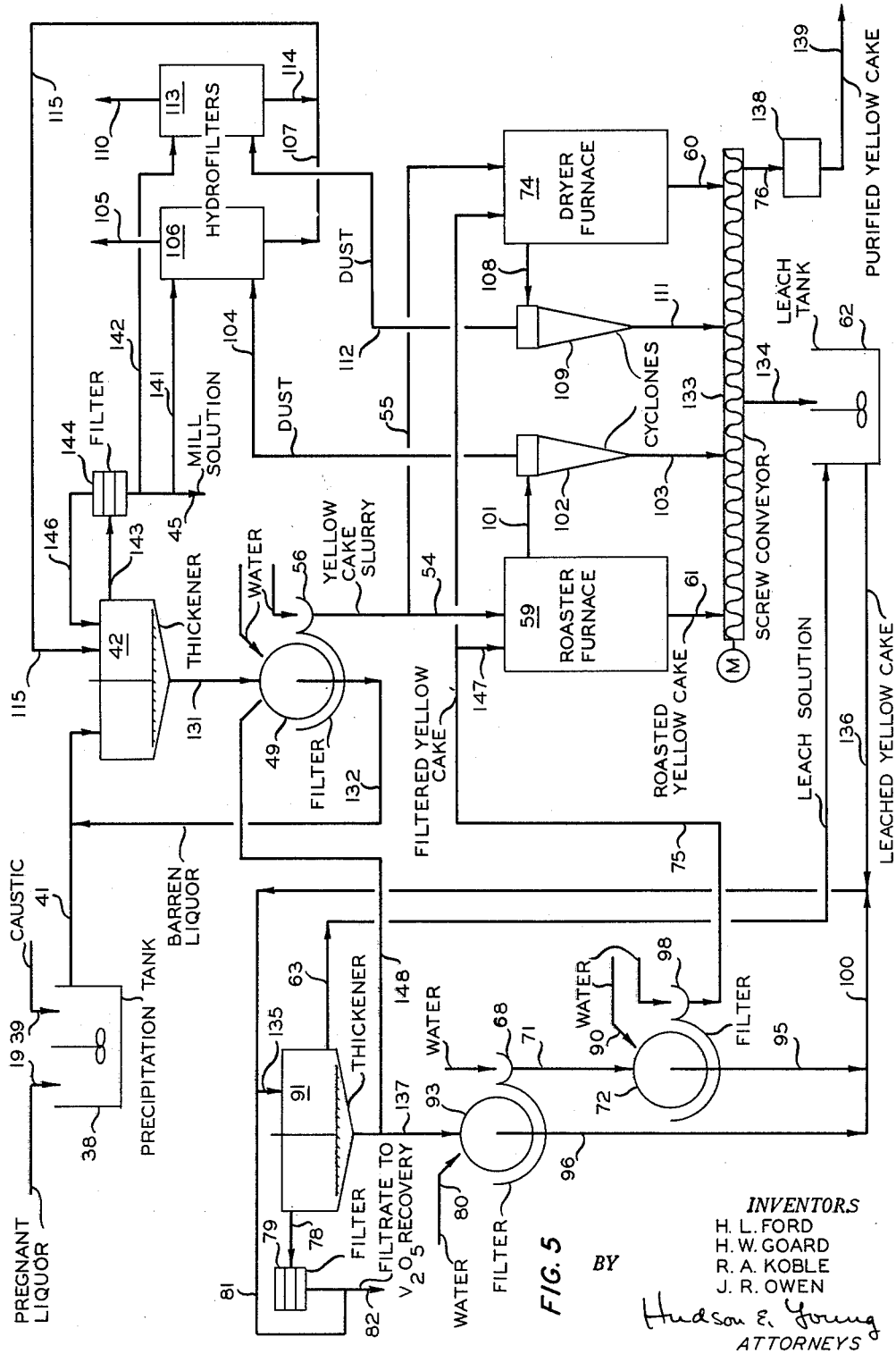
FIGURE 5 is a flowsheet which illustrates a preferred embodiment of this invention, the particular continuous process schematically shown in this figure incorporating "blocked-out operation" features which illustrate the versatility of the process.

FIGURE 5 illustrates the preferred embodiment of the purification process of this invention. Referring now to this figure, pregnant liquor containing soluble uranium values, is passed via line 19 to precipitation tank 38 where the uranium values are precipitated with aqueous caustic or sodium hydroxide solution supplied thereto via line 39. The precipitate-containing slurry is then passed via line 41 to thickener 42. Underflow from thickener 42 is withdrawn by line 131 and passed to vacuum drum filter 49. Filtrate, comprising barren liquor, is withdrawn from filter 49 and recycled via lines 132 and 41 to thickener 42. The filtered yellow cake precipitate is removed from the filter 49 and repulped in a repulp trough 56, from which it is passed in the form of a slurry via line 54 to a roaster furnace 59, where the impure yellow cake is roasted at temperatures in the range of 1100–1700° F., preferably 1500–1600° F., fuel for this furnace, for example natural gas, being supplied thereto to furnish the necessary heat. Exhaust gases from roaster 59, comprising water and dust, are withdrawn via line 101 and passed to cyclone separator 102. The roasted yellow cake is withdrawn from furnace 59 by a discharge line 61 and dumped into a screw conveyor 133 having a reversible flight therein. The roasted yellow cake is discharged from screw conveyor 133 via line 134 into a leach tank 62 where it is quenched and leached with an aqueous leach solution supplied via line 63. The slurry of leached yellow cake is withdrawn from leach tank 62 and passed via lines 136 and 135 to a thickener 91, the source of the leach solution. Overflow from thickener 91 is withdrawn via line 78 and passed to a small filter 79, such as a plate-press filter, for the removal of fines which are recycled via lines 81 and 135 to the thickener 91, the clarified filtrate comprising an aqueous solution of soluble vanadium values being withdrawn via line 82.

Underflow from thickener 91 is withdrawn via line 137 and passed onto a vacuum drum filter 93, the filtrate from this filter being recycled via lines 96, 100, and 135 to thickener 91. The filtered yellow cake, after washing the same with water supplied via line 80, is removed from filter 93 and repulped in repulper trough 68, the repulped yellow cake then being passed via line 71 onto another vacuum drum filter 72 where it is washed with water supplied via line 90. Filtrate from filter 72 is withdrawn via line 95 and it too is recycled to thickener 91 via lines 95, 100, and 135. The filtered yellow cake is removed from filter 72, repulped in repulper trough 98 and passed via line 75 to drier furnace 74 where the leached yellow cake is dried, for example at 1000–1600° F. Exhaust gas comprising moisture and dust are removed from furnace 74 via line 108 and passed to cyclone separator 109. The dried yellow cake is removed from furnace 74 via line 60, passed through the end of conveyor 133, removed therefrom via line 76, passed through a hammer mill 138 and then passed via line 139 to suitable packaging equipment, this purified yellow cake being the product of the process.

The exhaust gases from cyclone separators 102 and 109 are passed via lines 104 and 112, respectively, to hydrofilters 106 and 113. In hydrofilters 106 and 113, the exhaust gases are contacted with filtered overflow from thickener 42 supplied by lines 141 and 142, respectively. The overflow from thickener 42 is withdrawn via line 143, filtered in a small filter 144, such as a Sparkler filter, the small amount of filtered yellow cake being returned via line 146 to thickener 42 and the excess filtrate 45, comprising barren liquor, being recarbonated and recycled to the filtration process used for filtering the leached ore slurry. The slurry from hydrofilters 106 and 113 is recycled via lines 107 and 114 to the thickener 42.

A material balance of the continuous process of FIGURE 5 is given below.

*Material Balance*

| Item (Fig. 5) | Solution (tons/day) | Yellow (lbs./day) | $V_2O_5$ (lbs./day) | Circulating $V_2O_5$ (lbs./day) |
|---|---|---|---|---|
| 41 | 1,320 | 10,000 | 600 | |
| 115 | 186.25 | 497.5 | 20 | |
| 132 | 43.75 | | | |
| 146 | 0.01 | 100 | | |
| 45 | 1,313 | | | |
| 131 | 45 | 10,497.5 | 620 | |
| 54 | 1.25 | 10,497.5 | 620 | |
| 101 | 1.25 | 1,500 | 90 | |
| 61 | | 8,997.5 | 530 | |
| 103 | | 1,200 | 72 | |
| 111 | | 1,000 | 10 | |
| 134 | | 10,197.5 | 602 | |
| 63 | 300 | | | 21,500 |
| 136 | 300 | 10,197.5 | 602 | 21,500 |
| 135 | 335.35 | 10,197.5 | 602 | 23,530 |
| 81 | | 1.2 | | |
| 82 | 7 | | 500 | |
| 137 | 28.35 | 10,197.5 | 102 | 2,030 |
| 80 | ¹6 | | | |
| 96 | 31 | | | 1,830 |
| 71 | 3.35 | 10,197.5 | 102 | 200 |
| 90 | ¹6 | | | |
| 95 | 4.35 | | | 200 |
| 75 | 5 | 10,197.5 | 102 | |
| 108 | 5 | 1,200 | 12 | |
| 60 | | 8,997.5 | 90 | |
| 139 | | 9,997.5 | 100 | |
| 104 | 1.25 | 300 | 18 | |
| 141 | 96 | | | |
| 107 | 91.25 | 298 | 18 | |
| 105 | 6 | 2 | | |
| 112 | 5 | 200 | | |
| 142 | 96 | | | |
| 114 | 95 | 199.5 | 2 | |
| 110 | 6 | 0.5 | | |

¹ $H_2O$.

The above-described process can be operated on a continuous cycle and it has incorporated therein certain "blocked-out features" which increases the versatility of the process. During continuous operation, both furnaces 59 and 74 are used as well as the three filters 49, 93 and 72. During blocked-out operation, for example when it is necessary to repair one of the furnaces or filters, only one filter is used continuously. This blocked-out operation permits the process to run at full capacity while repairs or other maintenance operations are being carried out.

The continuous operation of the process illustrated in FIGURE 5 and described above will now be described in detail, as well as the blocked-out operation.

During the continuous operation of the process illustrated in FIGURE 5, thickener 42 is always maintained full of the slurry of precipitated yellow cake and filter 49 is used continuously to filter the underflow therefrom. The filtered yellow cake is continuously roasted in roaster furnace 59 and the leached roasted yellow cake is supplied to thickener 91 in a continuous manner to maintain it at full capacity. Further, during continuous operation filters 93 and 72 are continuously operated in series to filter the leached yellow cake, and drier furnace 74 is continuously operated to dry the filtered purified yellow cake.

Assuming that the drier furnace 74 is in need of repair and must be taken out of operation, the continuous process illustrated in FIGURE 5 is speeded up to empty thickener 42, that is, the underflow therefrom is withdrawn at a rate faster than it is normally continuously supplied thereto from precipitation tank 38. When thickener 42 is essentially emptied, filter 49 is no longer used to filter the precipitated yellow cake, and nothing is passed to roaster furnace 59 or leach tank 62. As a result, the level of leached yellow cake in thickener 91 gradually goes down, and while this is occurring filters 93 and 72 continue to filter the leached yellow cake and drier furnace 74 is used to dry the filtered leached yellow cake until the level on thickener 91 has fallen to a predetermined level. By this time, thickener 42 is full, furnace 74 is taken out of operation, and the process is ready to be switched to the blocked-out operation.

During the blocked-out operation of the process shown in FIGURE 5, filter 49 is used to filter the underflow from thickener 42 at a rate substantially greater than the input of precipitated yellow cake slurry thereto from precipitation tank 38, thus causing the level in thickener 42 to fall. The filtered yellow cake from filter 49 is roasted in roaster furnace 59, quenched and leached in leach tank 62, and the leached yellow cake slurry passed to thickener 91 and allowed to accumulate therein, thus raising the level therein.

When thickener 91 is full, or thickener 42 is empty, whichever occurs first, filter 49 is then stopped, and filtered yellow cake from filters 93 and 72 is dried by passing the same via line 75 and 147 to furnace 59.

When thickener 42 is full again, or thickener 91 is emptied again, whichever occurs first, filter 49 is then used to filter the underflow from thickener 42 supplied thereto via line 131, and leached yellow cake slurry is allowed to accumulate in thickener 91.

After the drier furnace 74 has been repaired the process can then be switched back to continuous operation. For example, if at the time the drier furnace 74 is ready to go back into operation, and the underflow from thickener 42 is being filtered by filter 49, this filtering operation is continued at the normal rate so as to allow thickener 42 to be maintained at full capacity. Similarly, thickener 91 is allowed to fill to full capacity with leached yellow cake slurry, and filters 93 and 72 are used to filter the underflow therefrom, the filtered yellow cake then being passed once again via line 75 to drier furnace 74 for the purpose of drying the filtered, purified yellow cake.

If at the time furnace 74 is ready to go back into operation and filter 49 is idle (i.e., thickener 42 is filling) this sequence of blocked-out operations is continued until thickener 42 is filled. Filter 49 is then operated to filter slurry from thickener 42, furnace 59 is used for roasting, and drier furnace 74 is used for drying.

If it is furnace 59 that is in need of repair, furnace 74 can be similarly used in the blocked-out operation for alternate service in roasting and drying, use being made of conduit 55 instead of conduit 54 to supply furnace 74 with slurry to be roasted. When furnace 74 is used for roasting, screw conveyor 133 is reversed so that the roasted yellow cake is conveyed via lines 60 and 134 to leach tank 62.

If one or both of filters 93 and 72 are taken out of service for repairs, operation may proceed in the blocked-out sequence described by using filter 49 to alternately filter slurry from thickeners 42 and 91.

Various modifications and alterations of this invention will become apparent to those skilled in the art, without departing from the scope and spirit of this invention, and it should be understood that the foregoing discussion and accompanying drawing should not be construed so as to unduly limit this invention.

We claim:

1. A method for purifying yellow cake, comprising sodium diuranate containing vanadium values as impurity, which method comprises roasting said yellow cake at elevated temperatures in a first heating zone to solubilize said vanadium values, withdrawing the resulting roasted yellow cake from said first heating zone and passing the same to a leaching zone, contacting said roasted yellow cake in said leaching zone with an aqueous leaching solution to dissolve said solubilized vanadium values, withdrawing a slurry of leached yellow cake and leach solution containing soluble vanadium values from said leaching zone and passing said slurry to a thickening zone, thickening said slurry in said thickening zone, withdrawing from said thickening zone an overflow stream comprising leach solution containing a substantial amount of said soluble vanadium values, separating said overflow stream into a yellow cake portion and as a first product of the process a solution containing a substantial amount of said soluble vanadium values, recycling said yellow cake portion to said thickening zone, withdrawing a stream of leach solution from said thickening zone and passing the same to said leaching zone, withdrawing from said thickening zone an underflow stream comprising a slurry of thickened yellow cake, filtering said underflow stream in a first filtration zone to obtain a filtrate comprising leach solution and a yellow cake residue, washing said residue in said first filtration zone with water, recycling said filtrate and the resulting washings to said thickening zone, removing said yellow cake residue from said first filtration zone and repulping the same with water, filtering the resulting repulped yellow cake in a second filtration zone to obtain a filtrate and a yellow cake residue, washing the latter residue in said second filtration zone with water, recycling the latter filtrate and resulting washings to said thickening zone, repulping the latter residue and passing the resulting repulped yellow cake to a second heating zone, drying the latter repulped yellow cake at elevated temperatures in said second heating zone, and withdrawing the resulting dried, purified yellow cake from said second heating zone as a second product of the process.

2. The method according to claim 1, wherein one heating zone is used as said first and second heating zones and said one heating zone is used alternately to roast said yellow cake to solubilize said vanadium values and to dry leached yellow cake.

3. A method for purifying yellow cake, comprising sodium diuranate containing vanadium values as impurities, which method comprises roasting said yellow cake at elevated temperatures in a first heating zone to solubilize said vanadium values, withdrawing the resulting roasted yellow cake from said first heating zone and passing the same to a leaching zone, contacting said roasted yellow cake in said leaching zone with an aqueous leaching solution to dissolve the solubilized vanadium values, withdrawing a slurry of leached yellow cake and leach solution containing soluble vanadium values from said leaching zone and passing said slurry to a separation zone, thickening said slurry in said separation zone, withdrawing from said separation zone a first stream comprising leach solution containing a substantial amount of said soluble vanadium values, separating said first stream into a yellow cake portion and as a first product of the process a solution containing a substantial amount of said soluble vanadium values, recycling said yellow cake portion to said separation zone, withdrawing from said separation zone a second stream comprising leach solution and passing the same to said leaching zone, withdrawing from said separation zone a third stream comprising a slurry of thickened yellow cake, filtering said third stream in a filtration zone to obtain a yellow cake residue and a filtrate comprising leach solution, recycling said filtrate to said separation zone, passing said yellow cake residue to a second heating zone, drying said yellow cake residue in said second heating zone at elevated temperatures, and withdrawing the resulting dried, purified yellow cake from said second heating zone as a second product of the process.

4. A method for purifying yellow cake, comprising sodium diuranate containing vanadium values as an impurity, which method comprises roasting said yellow cake at elevated temperatures in a first heating zone to solubilize said vanadium values, withdrawing the resulting roasted yellow cake from said first heating zone and passing the same to a leaching zone, contacting said roasted yellow cake in said leaching zone with an aqueous leaching solution to dissolve the solubilized vanadium values, withdrawing a slurry of leached yellow cake and leach solution containing soluble vanadium values from said leaching zone, passing said slurry to a first filtration zone, filtering said slurry in said first filtration zone to obtain a yellow cake residue and a filtrate comprising leach solution containing a substantial amount of said soluble vanadium values, passing said filtrate to a thickening zone, thickening said filtrate in said thickening zone, withdrawing from said thickening zone a first stream comprising leach solution containing a substantial amount of soluble vanadium values, separating said first stream into a yellow cake portion and as a first product of the process a solution containing a substantial amount of said soluble vanadium values, recycling said yellow cake portion to said thickening zone, withdrawing from said thickening zone a second stream comprising a slurry of thickened yellow cake, passing said second stream into said first filtration zone, withdrawing said yellow cake residue from said first filtration zone, repulping the thus withdrawn yellow cake residue, passing the resulting repulped yellow cake to a second filtration zone, filtering said resulting repulped yellow cake in said second filtration zone to obtain a yellow cake residue and a filtrate, washing the yellow cake residue in said second filtration zone with water, passing the filtrate and washings from said second filtration zone to at least one of said leaching zone, said thickening zone and said first filtration zone, withdrawing the yellow cake residue from said second filtration zone and repulping the same, passing the resulting repulped yellow cake to a second heating zone and therein drying the repulped yellow cake at elevated temperatures, and withdrawing the resulting dried, purified yellow cake from said second heating zone as a second product of the process.

5. A method for purifying yellow cake comprising sodium diuranate containing vanadium values as an impurity which comprises passing said yellow cake to one of a first heating zone and a second heating zone and therein roasting said yellow cake at elevated temperatures to solubilize said vanadium values, withdrawing the resulted roasted yellow cake from said one of said first and second heating zones and passing the thus withdrawn roasted yellow cake to a leaching zone, contacting said roasted yellow cake in said leaching zone with an aqueous leaching solution to dissolve the solubilized vanadium values, withdrawing a slurry of leached yellow cake and leach solution containing soluble vanadium values from said leaching zone and passing said slurry to a thickening zone, thickening said slurry in said thickening zone, withdrawing from said thickening zone a first stream comprising leach solution containing a substantial amount of said soluble vanadium values, separating said first stream into a yellow cake portion and as a first product of the process a solution containing a substantial amount of said soluble vanadium values, recycling said yellow cake portion to said thickening zone, withdrawing from said thickening zone a second stream comprising leach solution and passing the same to said leaching zone, withdrawing from said thickening zone a third stream comprising a slurry of thickened yellow cake, filtering said third stream in a first filtration zone to obtain a yellow cake residue and a filtrate comprising leach solution, recycling said filtrate to said thickening zone, removing said yellow cake residue from said first filtration zone and repulping the same with water, filtering the resulting repulped yellow cake in a second filtration zone to obtain a yellow cake residue and a filtrate, recycling the filtrate from said second filtration zone to said thickener, withdrawing the yellow cake residue from said second filtration zone and passing the same to one of said first and second heating zones and therein drying the yellow cake residue at elevated temperatures, and withdrawing the resulting dried, purified yellow cake as a second product of the process from the one of said first and second heating zones to which the yellow cake residue is passed.

References Cited in the file of this patent
UNITED STATES PATENTS

| 1,054,102 | Fischer | Feb. 25, 1913 |
| 1,224,014 | Parsons | Apr. 24, 1917 |
| 2,950,951 | Sherk | Aug. 30, 1960 |

OTHER REFERENCES

Perry: "Chem. Engineers Handbook," 3rd edition, pp. 937–955 (1950).

Butler: "Engineering and Mining Journal," vol. 152, No. 3, pp. 56–62, March 1951.

Atomic World, March 1959, pp. 96–98.

Clegg et al.: "Uranium Ore Processing," pp. 132, 141, 143, 146–149, 163, 164, 185, 281, 287, 298–304, 354, 360.